UNITED STATES PATENT OFFICE.

AUGUST BLANK, CARL HEIDENREICH, AND JOHANNES JANSEN, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

COTTON-DYES.

1,082,925.   Specification of Letters Patent.   Patented Dec. 30, 1913.

No Drawing.   Application filed March 28, 1913. Serial No. 757,370.

*To all whom it may concern:*

Be it known that we, AUGUST BLANK, CARL HEIDENREICH, and JOHANNES JANSEN, doctors of philosophy, chemists, citizens of the German Empire, residing at Leverkusen, near Cologne-on-the-Rhine, Germany, have invented new and useful Improvements in Cotton-Dyes, of which the following is a specification.

We have found that new and valuable cotton dyes can be obtained by combining with an azo component, such as resorcin, meta-diamins, meta-aminophenol or their derivatives, the diazo compounds obtainable from the aminobenzoylamino compounds described in United States Letters Patent No. 1012853 having the formula:

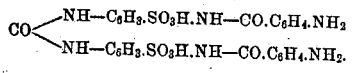

The new products are after being dried and pulverized in the shape of their alkaline salts brownish powders soluble in water generally with a yellowish coloration and yielding upon reduction with stannous chlorid and hydrochloric acid diaminodibenzoyldiaminodiphenylurea-disulfonic acid and an amin. They dye cotton yellow to orange-red shades. These colors are rendered very fast to washing by after-treatment with formaldehyde of fibers dyed with them.

In order to illustrate the new process more fully the following example is given, the parts being by weight:—49.5 parts of para-para-diaminodibenzoyldiaminodiphenylurea-disulfonic acid (sodium salt) are dissolved in 300 parts of hot water, the solution is cooled with ice to 10° C. and diazotized with 50 parts of hydrochloric acid and 10 parts of sodium nitrite. The diazotation is finished after stirring for 2-3 hours and the diazo compound is added to a cooled solution of 16 parts of resorcin in 700 parts of water containing 40 parts of $Na_2CO_3$. After some time the mixture is heated to 70° C. and the azo dye is salted out. It is after being dried and pulverized in the shape of its sodium salt a brown powder soluble in water with an orange-yellow coloration; in caustic soda lye with a yellowish-red coloration; and being soluble in concentrated sulfuric acid of 66° Bé. with a yellowish-brown coloration. It has in a free state most probably the formula:

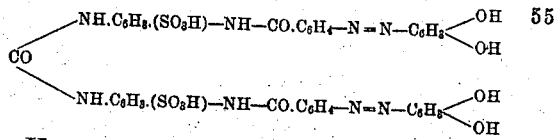

Upon reduction with stannous chlorid and hydrochloric acid para-para-diaminodibenzoyldiaminodiphenylurea-disulfonic acid and aminoresorcin are obtained. It dyes cotton in bright yellow shades, which are rendered fast to washing by treatment with formaldehyde.

An orange dye is obtained from para-para-diaminodibenzoyldiaminodiphenylurea-disulfonic acid and meta-phenylenediamin and a yellow product from meta-aminophenol.

Other of the above mentioned products can be used.

We claim:—

1. The herein described new azo dyestuffs being azo dyes obtained from diaminodibenzoyldiaminodiphenylurea-disulfonic acid; which are after being dried and pulverized in the shape of their alkaline salts brownish powders soluble in water generally with a yellowish coloration and yielding upon reduction with stannous chlorid and hydrochloric acid diaminodibenzoyldiaminodiphenylurea-disulfonic acid and an amin; dyeing cotton yellow to orange-red shades which are rendered fast to washing by an after-treatment with formaldehyde, substantially as described.

2. The herein-described new azo dyestuff which has in a free state most probably the formula:

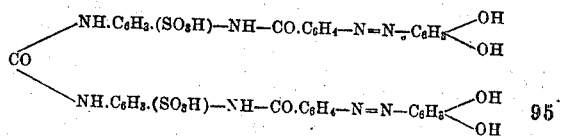

which is after being dried and pulverized in the shape of its sodium salt a brown powder soluble in water with an orange-yellow coloration; in caustic soda lye with a yellowish-red coloration; being soluble in concentrated sulfuric acid of 66° Bé. with a yellowish-brown coloration; and yielding upon reduction with stannous chlorid and hydrochloric acid para-para-diaminodibenzoyl-diaminodiphenylurea-disulfonic acid and aminoresorcin; dyeing cotton in bright yellow shades, fast to washing by an after-treatment with formaldehyde, substantially as described.

In testimony whereof we have hereunto set our hands in the presence of two subscribing witnesses.

AUGUST BLANK. [L. S.]
CARL HEIDENREICH. [L. S.]
JOHANNES JANSEN. [L. S.]

Witnesses:
HELEN NUFER,
ALBERT NUFER.

Copies of this patent may be obtained for five cents each, by addressing the "Commissioner of Patents, Washington, D. C."